US007057621B2

(12) United States Patent
Kwon et al.

(10) Patent No.: US 7,057,621 B2
(45) Date of Patent: Jun. 6, 2006

(54) SCREEN DISPLAY APPARATUS AND A METHOD FOR UTILIZING THE SCREEN DISPLAY APPARATUS IN A MOBILE TERMINAL

(75) Inventors: Dae-Heon Kwon, Kyongsangbuk-do (KR); Hoe-Gun You, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 259 days.

(21) Appl. No.: 09/931,819

(22) Filed: Aug. 17, 2001

(65) Prior Publication Data

US 2002/0036642 A1     Mar. 28, 2002

(30) Foreign Application Priority Data

Sep. 26, 2000   (KR)   ............................. 2000-56437

(51) Int. Cl.
*G09G 5/39*       (2006.01)

(52) U.S. Cl. .................. 345/531; 345/530; 345/536; 345/3.4; 345/546; 345/699

(58) Field of Classification Search .............. 345/536, 345/531, 3.1, 3.3, 3.4, 5, 698, 800, 600, 699, 345/530, 604, 619, 629, 634, 660; 455/421, 455/38.4; 340/7.51, 7.52; 382/177, 299
See application file for complete search history.

(56) References Cited

U.S. PATENT DOCUMENTS

| 5,402,148 A | * | 3/1995 | Post et al. .................... 345/698 |
| 5,978,016 A | * | 11/1999 | Lourette et al. ............... 348/64 |
| 6,278,447 B1 | * | 8/2001 | Anderson .................... 345/723 |
| 6,377,818 B1 | * | 4/2002 | Irube et al. ............... 455/556.1 |

FOREIGN PATENT DOCUMENTS

| EP | 0 265 643 A2 | 9/1987 |
| GB | 2 180 128 A | 3/1987 |
| JP | 61-254986 | 11/1986 |
| JP | 06-308927 | 11/1994 |

OTHER PUBLICATIONS

UK Search Report dated Mar. 26, 2002 issued in GB Appln. No. 0123137.2.

* cited by examiner

*Primary Examiner*—Matthew C. Bella
*Assistant Examiner*—Hau Nguyen
(74) *Attorney, Agent, or Firm*—Dilworth & Barrese LLP

(57) ABSTRACT

An apparatus and method for displaying a multimedia screen in a mobile terminal. A first memory selectively stores multimedia image data received at a service request of the mobile terminal or text data and background screen image data provided for a display service of the mobile terminal. A second memory stores the text data and the background screen image data. An image output processor reads data from the first memory and the second memory, and provides the read data to a display unit of the mobile terminal.

4 Claims, 3 Drawing Sheets

US 7,057,621 B2

SCREEN DISPLAY APPARATUS AND A METHOD FOR UTILIZING THE SCREEN DISPLAY APPARATUS IN A MOBILE TERMINAL

PRIORITY

This application claims priority to an application entitled "Screen Display Apparatus and Method in a Mobile Terminal" filed in the Korean Industrial Property Office on Sep. 26, 2000 and assigned Serial No. 2000-56437, the contents of which are hereby incorporated by reference.

BACKGROUND OF THE INVENTION

1. Field of the Invention

The present invention relates generally to a mobile terminal, and in particular, to a screen display apparatus and a method for utilizing the screen display apparatus in a mobile complex communication terminal.

2. Description of the Related Art

Recently the rapid development of the information society has required the development of a complex communication terminal, which can support various additional functions as well as the existing voice transmission function. Therefore, to meet the needs of the multimedia era, there is a demand for a mobile complex communication terminal, which can support an image transmission function as well as the existing voice transmission function.

Presently, there are only a few mobile terminals that can be considered mobile complex communication terminals.

For example, a mobile complex communication terminal with a built-in camera is disclosed in U.S. patent application Ser. No. 09/540,830, filed on Mar. 31, 2000, by the applicant, entitled "Mobile Complex Communication Terminal for Voice and Image Transmission, and Method and Communication System for Operating the Same".

Further, a mobile complex communication terminal with a built-in television is disclosed in U.S. patent application Ser. No. 09/467,210, filed on Dec. 20, 1999, by the applicant, entitled "United Mobile Phone and Television, and Method for Controlling the Same".

As stated above, the mobile complex communication terminal supports a moving image service as well as the existing voice call service, so that it requires a high-resolution display unit in order to attract the users' attention. In addition, the mobile terminal is required to display various screens on the display unit.

SUMMARY OF THE INVENTION

It is, therefore, an object of the present invention to provide an apparatus and a method for displaying a multimedia screen in a mobile complex communication terminal.

It is another object of the present invention to provide an apparatus and method for overlapping a high-resolution background screen and a multimedia screen over an existing screen on a display unit.

It is yet another object of the present invention to provide an apparatus and method for displaying a high-resolution background screen on a display unit.

To achieve the above and other objects, there is provided a screen display apparatus in a mobile terminal. In the screen display apparatus, a first memory selectively stores multimedia image data received at a service request of the mobile terminal or text data and background screen image data provided for a display service of the mobile terminal. A second memory stores the text data and the background screen image data. An image output processor reads data from the first memory and the second memory, and provides the read data to a display unit of the mobile terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 3:
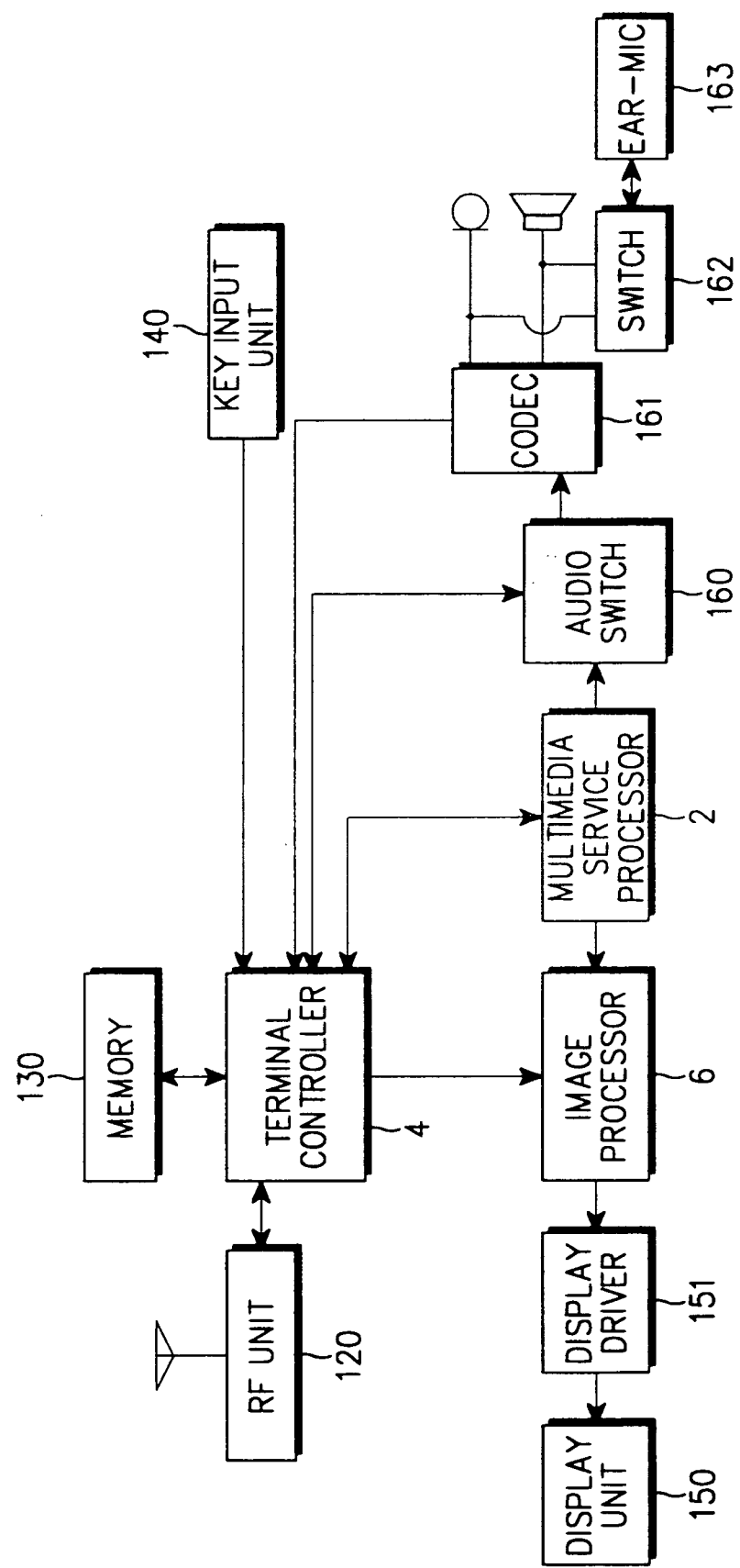
FIG. 3 is a block diagram illustrating a mobile terminal to which the present invention is applied.

FIG. 3 illustrates a structure of a mobile terminal to which the present invention is applied. The mobile terminal is comprised of: a multimedia processor 2, a terminal controller 4, an image processor 6, a Radio Frequency (RF) unit 120, a memory 130, a key input unit 140, a display unit 150, a display driver 151, an audio switch 160, a CODEC (Coder/Decoder) 161, a switch 162 and an ear-microphone (EAR-MIC) 163.

Terminal controller 4 controls the overall operation of the mobile terminal. Specifically, the terminal controller 4 controls a call processing function and general functions such as phone number management, scheduling, voice dialing, bell mode selection, and display control functions. Memory 130 stores various operating programs of the mobile terminal, phone number data, and schedule data. RF unit 120 performs up-conversion, down-conversion, filtering and amplification, and transmits and receives a radio signal. Key input unit 140 includes a plurality of alphanumeric keys, and may also include a mouse device or a touch screen for a multimedia service according to an embodiment of the present invention. Display unit 150, comprised of a color TFT LCD (Thin Film Transistor Liquid Crystal Display), displays text information, menu information, still images and moving images under the control of a display driver 151. CODEC 161 decodes an audio signal received from a counterpart mobile terminal and encodes an audio signal input from a microphone MIC. The CODEC 161 can be realized by a DSP (Digital Signal Processor) chip. Switch 162 switches an audio signal output from the CODEC 161 and an audio signal input from the user through the microphone MIC, to form an audio signal path to the CODEC 161, an ear-microphone 163, a speaker SPK, and the microphone MIC. An image processor 6 buffers the text information, menu information, still images and moving images received from the terminal controller 4 and multimedia service processor 2, subjects the buffered data to D/A (digital-to-analog) conversion, and provides the D/A-converted data to the display driver 151. The multimedia service processor 2, at a multimedia service request of the user, accesses a corresponding server, sends a data request to the server for audio and image data, and buffers the received audio and image data on a real time basis. The multimedia service processor 2 provides the received image data to the image processor 6, the received menu and text information to the terminal controller 4, and the received voice data to the CODEC 161.

Figure 1:
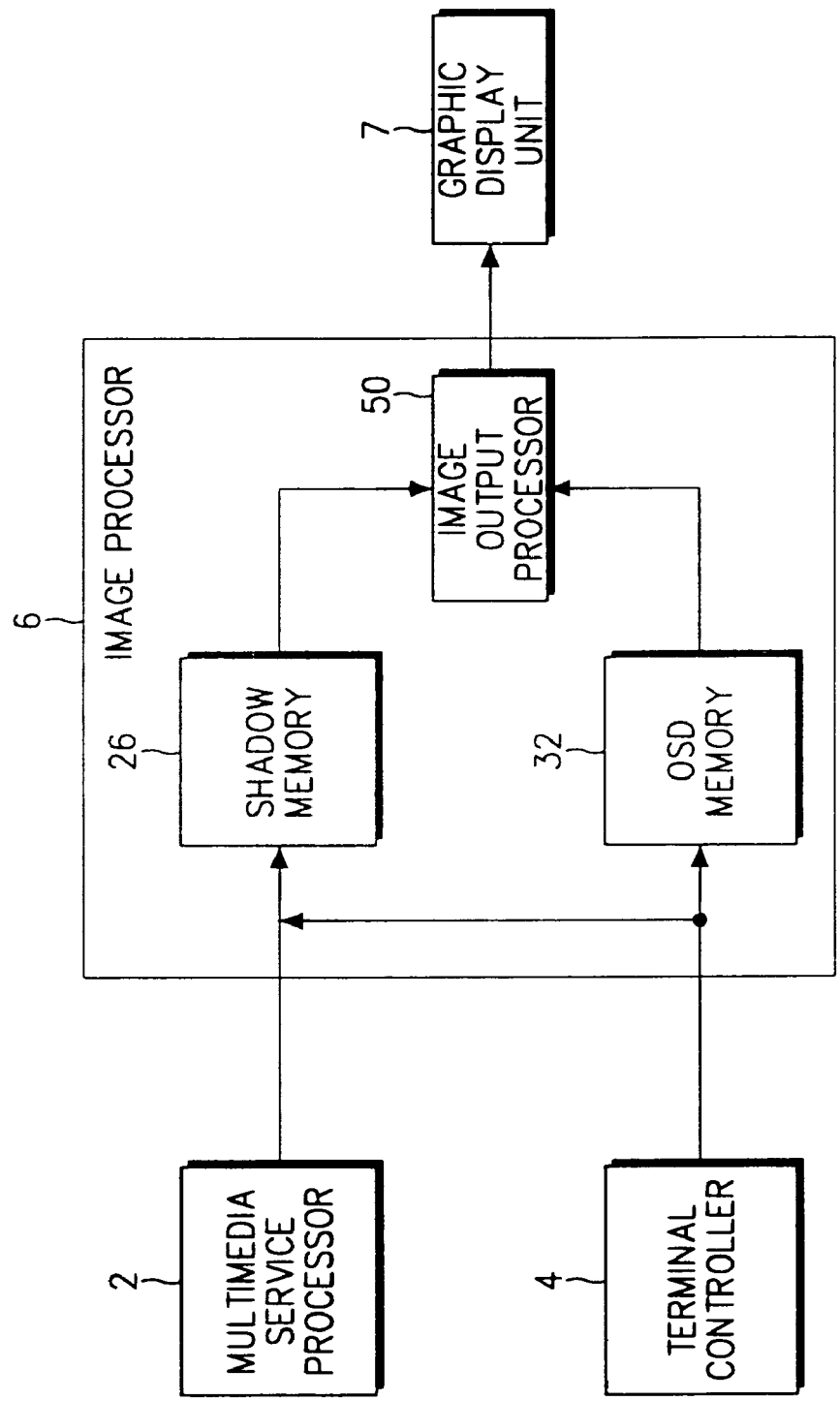
FIG. 1 is a block diagram illustrating a screen display apparatus in a mobile terminal, according to an embodiment of the present invention.
Figure 2:
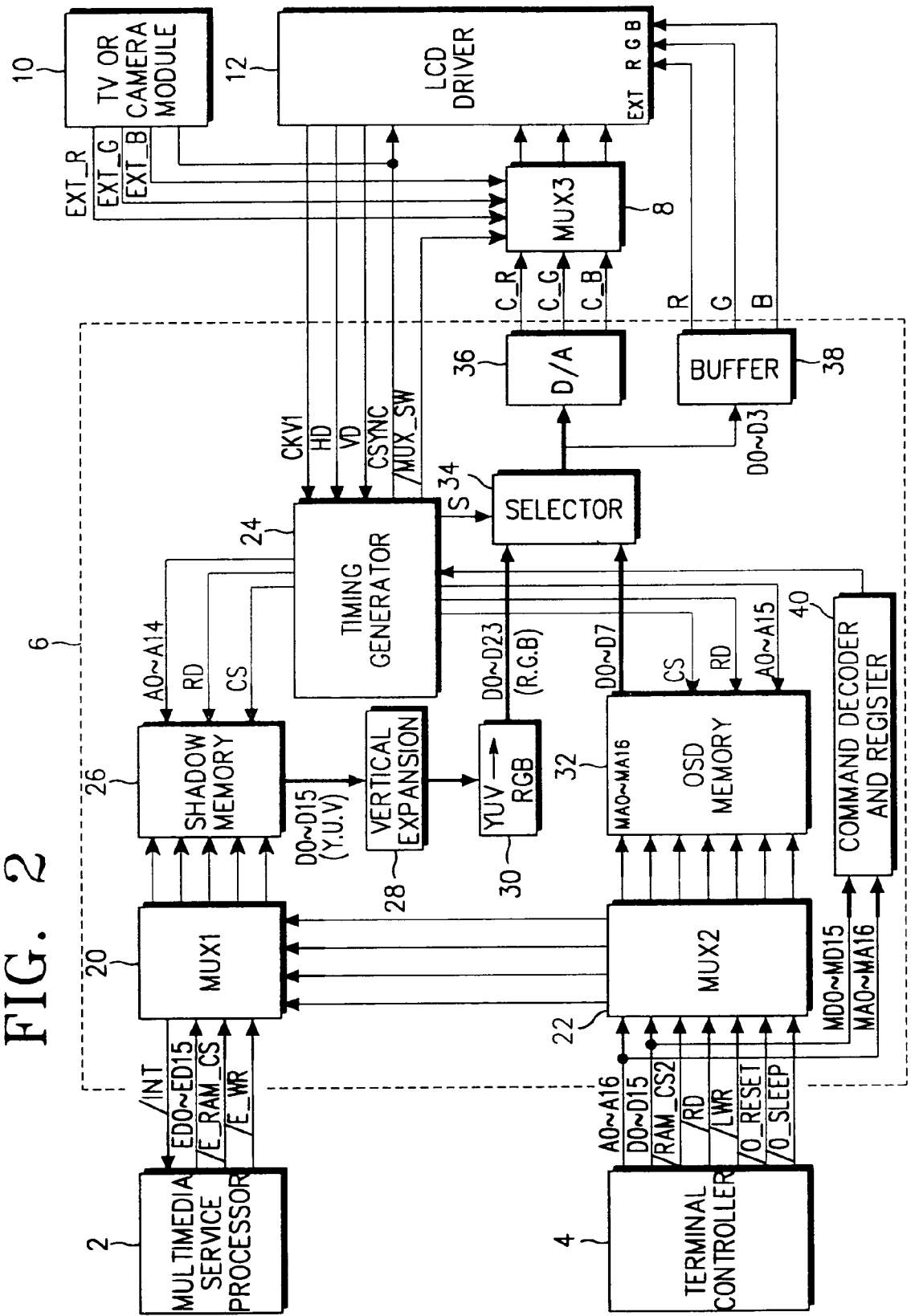
FIG. 2 is a detailed block diagram illustrating the screen display apparatus in the mobile terminal, according to an embodiment of the present invention.

FIG. 1 illustrates a screen display apparatus in a mobile terminal, according to an embodiment of the present invention. The screen display apparatus includes a multimedia service processor 2, a terminal controller 4, an image processor 6, and a graphic display unit 7. The multimedia service processor 2, the terminal controller 4 and the image processor 6 of FIG. 1 are equivalent to the multimedia service processor 2, the terminal controller 4 and the image processor 6 of FIG. 3, and the graphic display unit 7 of FIG. 1 is equivalent to the display driver 151 and the display unit 150 of FIG. 3. FIG. 2 illustrates the detailed structure of the screen display apparatus in the mobile terminal, according to an embodiment of the present invention. Specifically, FIG. 2 illustrates the detailed structure of the image processor 6 shown in FIG. 1.

Referring first to FIG. 1, the terminal controller 4 controls the overall operation of the mobile terminal. Specifically, the terminal controller 4 controls a call processing function and general functions such as phone number management, scheduling, voice dialing, bell mode selection, and display control functions. In particular, the terminal controller 4 provides the image processor 6 with text data and background screen data to be displayed through the graphic display unit 7, according to an embodiment of the present invention. The background screen data can be downloaded from a personal computer (PC) or received from other mobile terminals. The background screen may be either a still image or a moving image. For example, the background screen may include an image or an animation unique to the user.

The multimedia service processor 2, at a multimedia service request of the user, accesses a corresponding server, sends a data request to the server for audio and image data, and then buffers the received audio and image data on a real time basis. The multimedia service processor 2 provides the received image data (still images and moving images, referred to as "multimedia image data" hereinafter) to the image processor 6, the received menu and text information to the terminal controller 4, and the received voice (or audio) data to the CODEC 161 (see FIG. 3).

The image processor 6 includes a shadow memory 26, an OSD (On-Screen Display) memory 32 and an image output processor 50. The shadow memory 26 stores the text data and the background screen image data provided from the terminal controller 4, under the control of the terminal controller 4, and also stores the multimedia image data provided from the multimedia service processor 2, under the control of the multimedia service processor 2. The shadow memory 26, according to an embodiment of the present invention, has a capacity of 64 Kbytes, and each screen frame stored in the shadow memory 26 has a size of 176 (horizontal pixel number)×144 (vertical pixel number)×16 (resolution per pixel). The OSD memory 32 stores the text data and the background screen image data provided from the terminal controller 4. In this embodiment of the present invention, the OSD memory 32 has a capacity of 64 Kbytes, and each screen frame stored in the OSD memory 32 has a size of 176 (horizontal pixel number)×218 (vertical pixel number)×8 (resolution per pixel).

The image output processor 50 provides the data from a selected one of the shadow memory 26 and the OSD memory 32 to the graphic display unit 7.

Referring to FIG. 2, the image processor 6 further includes a first multiplexer (MUX1) 20 and a second multiplexer (MUX2) 22 in addition to the shadow memory 26 and the OSD memory 32. The image output processor 50 of FIG. 1 includes a timing generator 24, a vertical expansion unit 28, a YUV-to-RGB converter 30, a selector 34, a D/A converter 36, a buffer 38, and a command decoder and register 40.

The text data and the background screen image data provided from the terminal controller 4 are stored in the OSD memory 32 or the shadow memory 26 using addresses A0–A16, data D0–D15 and various control signals (/RAM_CS2, /RD, /LWR, /O_RESET and /O_SLEEP) from the terminal controller 4. The text data and the background screen image data are generally stored in the OSD memory 32. However, when it is necessary to display the text data and the background screen image data at a level of the real (or full) color, the text data and the background screen image data are stored in the shadow memory 26. Terminal controller 4 determines whether to store the text data and the background screen image data in the OSD memory 32 or the shadow memory 26. The text data and the background screen image data output from the terminal controller 4, when stored in the OSD memory 32, are provided to the OSD memory 32 through the second multiplexer 22. However, the text data and the background screen image data output from the terminal controller 4, when stored in the shadow memory 26, are provided to the shadow memory 26 through the second multiplexer 22 and the first multiplexer 20.

Since the data, which is outputted from the shadow memory 26 and provided to the graphic display unit 7, is comprised of 24 bits D0–D23, it can be displayed on the LCD of the graphic display unit 7 at a level of the real color (at high resolution). Since the data, which is output from the OSD memory 32 and provided to the graphic display unit 7, is comprised of 8 bits D0–D7, it is displayed on the LCD of the graphic display unit 7 at a level much lower than that of the real color (at low resolution).

The addresses A0–A16, data D0–D15 and various control signals (/RAM_CS2, /RD, /LWR, /O_RESET and /O_SLEEP) on an interface between the terminal controller 4 and the image processor 6 will now be described more specifically. Among the addresses A0–A16, the addresses A0–A15 are used for accessing the shadow memory 26 and the OSD memory 32, and the address A16 is used for reading/writing a register related to the image processor 6. D0–D15 represent the data to be written in the shadow memory 26 or the OSD memory 32. /RAM_CS2 indicates a chip select signal for selecting the OSD memory 32. /RD indicates a read enable signal used for reading data from the image processor 6. /LWR indicates a write enable signal used for, writing data in the image processor 6. /O_RESET indicates a signal used for resetting the image processor 6. /O_SLEEP indicates a signal used for switching an operation mode of the image processor 6 to a sleep mode.

Data ED0–ED15 and various control signals (/E_RAM_CS, /E_WR and /INT) on an interface between the multimedia service processor 2 and the image processor 6 will now be described. ED0–ED15 indicate the multimedia data provided from the multimedia service processor 2 to the shadow memory 26. /E_RAM_CS indicates a signal for selecting the shadow memory 26. /E_WR indicates a write enable signal used for writing the image data from the multimedia service processor 2 in the shadow memory 26 of the image processor 6. /INT indicates a signal used for preventing the multimedia image data from the multimedia service processor 2 from being written into the image processor 6, while the terminal controller 4 writes the text data and the background screen image data into the shadow memory 26.

The command decoder and register 40 decodes a command by receiving addresses MA0–MA16 and data MD0–MD15 provided from the terminal controller 4 and provides the decoded command to the timing generator 24. Further, the command decoder and register 40 sets and resets bit statuses of each register depending on the command.

The timing generator 24 generates various timing signals depending on CKV1, HD and VD signals provided from an LCD (Liquid Crystal Display) driver 12 and the command provided from the command decoder and register 40. The CKV1 signal provided from the LCD driver 12 to the timing generator 24 is a mode indication signal indicating whether the televising mode is an NTSC (National Television System Committee) mode or a PAL (Phase Alternative Line) mode. In the PAL mode, the CKV1 signal provided to the timing generator 24 is activated, since the even/odd lines must be removed. The HD and VD signals provided from the LCD driver 12 to the timing generator 24 are a horizontal synchronization signal and a vertical synchronization signal, respectively. The timing generator 24 provides address signals A0–A14, read signal RD and chip select signal CS to the shadow memory 26, and provides address signals A0–A15, read signal RD and chip select signal CS to the OSD memory 32. The timing generator 24 provides a chroma synchronization signal CSYNC to the LCD driver 12 and a select signal /MUX_SW to a third multiplexer (MUX3) 8. Further, the timing generator 24 provides a select signal S to the selector 34 so as to enable the selector 34 to select one of its input signals.

The 16-bit (YUV) image data D0–D15 stored in the shadow memory 26, under the control of the timing generator 24, is provided to the vertical expansion unit 28. The 16-bit (YUV) image data D0–D15 may be either the text data and the background screen image data provided from the terminal controller 4, or the multimedia image data provided from the multimedia service processor 2. The vertical expansion unit 28 vertically expands the image data (or text data) output from the shadow memory 26 so as to match it to the aspect ratio of the graphic display unit 7, and provides the expanded image data to the YUV-RGB converter 30. In the embodiment of the present invention, the vertical expansion unit 28 vertically expands input image data of 176×144 pixels per frame into image data of 176×218 pixels per frame. That is, the vertical expansion unit 28 vertically expands 16 bits into 24 bits. The YWV-RGB converter 30 subjects the (YUV) image data output from the vertical expansion unit 28 to YUV-to-RGB format conversion so as to output (RGB) image data that the graphic display unit 7 can process. The YUV-to-RGB format conversion is performed in accordance with the following formula.

$$R=Y+11/8(V-128)$$

$$G=Y-45/64(V-128)-43/128(U-128)$$

$$B=Y+111/64(U-128)$$

The image data output from the YUV-RGB converter 30 is comprised of 24 bits of D0–D23 (RGB). Therefore, the image data is displayed in 16,777,216 ($=2^{24}$) colors (at a level of the real color) on the LCD of the graphic display unit 7. The (RGB) image data D0–D23 output from the YUV-RGB converter 30 is applied to an input end of the selector 34. Further, the 8-bit (RGB) image data D0–D7 read from the OSD memory 32, under the control of the timing generator 24, is applied to another input end of the selector 34.

In another embodiment of the present invention, the timing generator 24 can also overlap the image data (background screen image data and multimedia image data) from the shadow memory 26 and the text data from the OSD memory 32 on the LCD. In this case, the mobile terminal can overlap the high-resolution background screen (or multimedia image) over the existing screen displayed on the LCD. Alternatively, the timing generator 24 can also display only the background screen image data from the shadow memory 26 on the LCD at a level of the real color.

The selector 34 optionally selects the (RGB) image data D0–D23 output from the YUV-RGB converter 30 and the 8-bit (RGB) image data read D0–D7 from the OSD memory 26 depending on the select signal S from the timing generator 24, and provides the selected image data to the D/A converter 36. The D/A converter 36 converts the input image data to analog image signals C_R, C_G, C_B, and applies the converted analog image signals to the LCD driver 12 of the graphic display unit 7 through the third multiplexer 8. The third multiplexer 8, in response to the select signal /MUX_SW provided from the timing generator 24, optionally selects the image signals C_R, C_G, C_B output from the image processor 6 and the external image signals EXT_R, EXT_G, EXT_B output from the TV or camera module 10.

The buffer 38 is used to provide the 4-bit image signal D0–D3 to the LCD driver 12 when the third multiplexer 8 is disabled.

As described above, the novel mobile terminal according to the present invention can overlap a high-resolution background screen and a multimedia screen over the existing screen on the LCD. In addition, the mobile terminal can display a high-resolution background screen on the LCD.

While the invention has been shown and described with reference to a certain preferred embodiment thereof, it will be understood by those skilled in the art that various changes in form and detail may be made therein without departing from the spirit and scope of the invention as defined by the appended claims.

The invention claimed is:

1. A screen display apparatus in a mobile terminal, comprising:
   a first memory for selectively storing multimedia image data received at a service request of the mobile terminal or text data and background screen image data provided for a display service of the mobile terminal;
   a second memory for storing the text data and the background screen image data; and
   an image output processor for reading data from the first memory and the second memory to form an image, and for providing the read data to a single display unit, the image output processor further comprising a vertical expander and a YUV-RGB converter, the vertical expander modifying the image to fit the display unit and the YUV-RGB converter converting the image from a YUV format to a RGB format.

2. A screen display apparatus in a mobile terminal having a display unit for displaying text data and image data, comprising:
   a first memory for storing data of a first resolution;
   a second memory for storing data of a second resolution lower than the first resolution;

a first, selector for selectively providing, in response to a first control signal, the first memory with image data received at a service request of the mobile terminal or text data and background screen image data provided for a display service of the mobile terminal;

a second selector for selectively providing the text data and the background screen image data to the first selector or the second memory in response to a second control signal; and an image output processor for reading data from the first memory and the second memory to form an image, and for providing the read data to the display unit of the mobile terminal, the image output processor further comprising a vertical expander and a YUV-RGB converter, the vertical expander modifying the image to fit the display unit and the YUV-RGB converter converting the image from a YUV format to a RGB format.

3. A screen display method in a mobile terminal including a display unit for displaying text data and image data, a first memory for outputting data of a first resolution and a second memory for outputting data of a second resolution lower than the first resolution, comprising:

selectively storing, in the first memory, multimedia image data received at a service request of the mobile terminal or text data and background screen image data provided for a display service of the mobile terminal;

storing the text data and the background screen image data in the second memory; and reading data from the first memory and the second memory to form an image;

modifying the image to fit the display unit;

converting the image from a YUV format to a RGB format; and, displaying the image on the display unit of the mobile terminal.

4. The screen display method as claimed in claim 3, wherein the first resolution is substantially equivalent to a level of a real color.

* * * * *